United States Patent [19]

Lawrence et al.

[11] Patent Number: 5,559,632
[45] Date of Patent: Sep. 24, 1996

[54] OPTICAL VIEWING SYSTEM FOR VIEWING 3-D IMAGES

[76] Inventors: John Lawrence; Linda S. Lukens, both of 2525 Verbena Dr., Los Angeles, Calif. 90068

[21] Appl. No.: 117,499

[22] Filed: Sep. 7, 1993

Related U.S. Application Data

[63] Continuation-in-part of Ser. No. 735,260, Jul. 24, 1991, abandoned.

[51] Int. Cl.$^6$ .............................. G02B 27/22; G02C 7/10
[52] U.S. Cl. .............................. 359/478; 351/44; 351/45; 359/462; 359/464
[58] Field of Search ............................ 359/464, 462, 359/478, 888; 351/44, 45

[56] References Cited

U.S. PATENT DOCUMENTS

| | | | |
|---|---|---|---|
| 4,893,898 | 1/1990 | Beard | 359/478 |
| 5,144,344 | 9/1992 | Takahashi et al. | 351/44 |

*Primary Examiner*—Scott J. Sugarman

[57] ABSTRACT

Improved methods for 3-D motion picture, video or video game images with a one camera system. When a scene is photographed using this system to create 3-D, the scene must be lit so that the midground light intensity is approximately 50% greater than the intensity on the foreground and the background light intensity is approximately double that of the foreground with some subjects in the scene being backlit as well. The scene is photographed by a movable video or motion picture camera moving about the scene at a constant angular velocity in the range of 25–60 degrees per second. Additional cameras photograph the scene from fixed locations spaced approximately 120 degrees apart about the scene. When editing the 3-D film or video tape a method is used to alleviate dizziness by inserting approximately 5–40 seconds of the flat shots from said fixed locations between segments of 3–25 seconds of film or video shot by said moving camera and providing viewing glasses having lenses, one of metallized (mirrored) plastic film creating a silvered effect, void of spectral peaks and of color absorption across all wavelengths, and which gives the lens a neutral density in the range of 0.5 to 2.0; and one lens formed of clear film which provides 100% light transmission when viewing through it.

5 Claims, 2 Drawing Sheets

OPTICAL VIEWING SYSTEM FOR VIEWING 3-D IMAGES

RELATED CASES

This application is a Continuation-In-Part of our patent application, Ser. No. 735,260, filed Jul. 24, 1991 now abandoned.

PRIOR ART

It has long been known that human beings can have depth perception due to the fact that human eyes are spaced several inches apart and, hence, provide the brain with two separate, but similar images, which the brain combines and interprets as three-dimensional. Attempts to reproduce this effect photographically have required the use of multiple cameras or cameras having a pair of spaced lenses. This has been relatively successful for still photography, as evidenced by the popularity of stereoscopic viewing devices, especially during the early part of this century.

However, similar success has not been achieved heretofore for motion pictures using stereoscopic 3-D. There was a time, in the 1950's, when stereoscopic motion pictures were popular. Classics like "The House of Wax" (1953) "The Creature from the Black Lagoon" (1954), and others were produced with the two camera stereoscopic process. Some of these movies did well, but 3-D in general became impractical due to the excessive costs of stereoscopic movies over standard 2-D motion pictures. Since stereoscopic movies had to be photographed with the stereoscopic two camera system, the cost of film stock and processing was doubled. Also, other exorbitant expenses, such as special polarized motion picture screens, had to be built for each movie house. These costs became so prohibitive that film makers found it safer, easier and more profitable to produce 2-D movies. Thus, by the late 1950's, they stopped making stereoscopic movie: and, once again, the picture industry turned its full attention to standard 2-D films.

The early 1970's saw a resurgence of stereoscopic 3-D. It spawned such features as "The Stewardess's" (1970), Andy Warhol's "Frankenstein in 3-D" (1974) and "Dracula in 3-D" (1975), as well as several others, but the interest, again, could not support the costs. Stereoscopic 3-D resurfaced, again, in 1982 with the very successful "Jaws 3-D" and "Metal Storm", but their cycle of success was short lived, again, because of the high prices that plagued the film producers of the '50's.

In addition, stereoscopic 3-D films cannot be transmitted to home T.V. and are not transferable to video tape for home viewing on T.V. without the use of costly and inconvenient electronic hardware. Since stereoscopic 3-D utilizes two almost identical pictures that have to be projected at the same time, with one over the other at a slightly different angle, the eyes must integrate the two pictures into one picture. This can only be done by wearing special polarized glasses. If viewed without the polarized glasses, the double picture provides only a distorted view, in which 3-D will not be seen and the viewers will suffer from eye strain, possible nausea and blurred vision. In the unlikely event that transmission problems could be overcome, people at home lacking viewing glasses would still be subject to these disorienting effects. Although stereoscopic 3-D can be startlingly effective, it is still much too costly, and hence risky, for today's motion picture industry.

In the 1920's, a German physicist and optics engineer, Carl Pulfrich, discovered that a stereoscopic effect can be obtained with a single motion picture camera by moving the camera, while filming, and viewing the film with glasses which reduce the intensity of light transmitted to one eye by over 80%. This effect is known as the "Pulfrich Effect" and produces a clear image, even when viewed without the special glasses. In U.S. Pat. Nos. 4,705,371; 4,836,647 and 4,893,898, T. D. Beard has proposed providing different colored components for the glasses' lenses which correspond to the color phosphors on television sets and are supposed to enhance the Pulfrich effect. Although his glasses show the Pulfrich effect and provide a clear picture, such lenses do distort color reception by the eye, unlike the glasses of the present invention. By altering, at least slightly, the colors seen by the viewer, dye filtering glasses limit the full use of chromostereography to enhance 3-D effects in a picture, as described in the Dudley U.S. Pat. No. 4,131,342. Although there have been many attempts to use the Pulfrich effect in the past, it has always been used as a 3-D special effect, in limited spans of time and has been perceived, basically, as a gimmick, and a modest attempt to simulate stereoscopic 3-D. No previous users recognized the necessity for regular interspersion of flat shots to break up the constant motion required by the Pulfrich effect and neutralize the disorientation it could produce in people. Even Kenyon, U.S. Pat. No. 4,941,041 only understood adding flat shots for variety, which is normal cinemagraphic technique, rather than as a specific technique to permit extended viewing time of the Pulfrich effect, which would allow continuous story telling of short to feature length shows. The necessity for constant movement of the camera, during photographing, requires that a special dolly and track must be provided for carrying the camera and cameraman and considerable care must be taken to prevent the cameraman from falling off of the moving dolly during photograpy since the camera speed must be greater as the distance to the subject increases. Also, constant motion of the camera does not lend itself to extended production times, as are required for dramatizations and the like. Moreover, if the camera speed is too slow, no dimensional effect will be obtained, while excessive rates of movement of the camera tend to make the viewer dizzy.

With the Pulfrich illusion, the main problem is simulating a stereoscopic 3-D picture. In order to do so, the camera, with the cameraman behind it, must be moving at all times and at the proper range of speed, as discovered by the present inventors. It has also been found that another critical factor in obtaining the three dimensional effect is proper lighting. As it is well known, motion picture and video photograhy requires that the scene be strongly illuminated, however most of the lighting is normally applied as "front lighting", to illuminate the scene as seen by a camera facing the scene. This lighting techinque only creates a marginal Pulfrich 3-D effect as not enough light is applied throughout the entire scene to create a layerd effect to produce the ideal Pulfrich 3-D. Thus, none of the prior art techiques for producing and presenting three-dimensional motion pictures and videos have been entirely satisfactory.

BRIEF SUMMARY AND OBJECTS OF INVENTION

These disadvantages of the prior art are overcome with the present invention and an improved technique for producing and presenting three-dimensional motion pictures, videos and computerized video games is provided which provides a strong apparent stereoscopic 3-D effect, without the distracting side effects, and while avoiding adverse results, such as dizziness, and nausea, together with improved lighting and the proper speed that the camera should be moving while photographing a scene to produce the optimum Pulfrich 3-D effect.

These advantages of the present invention are preferably attained by providing an improved technique for producing and presenting three-dimensional motion pictures, videos and video games wherein a scene to be photographed is illuminated in a manner such that the light intensity on the midground is approximately 50% greater than the intensity on the foreground and the light intensity on the background is approximately double that of the foreground and the scene is photographed by a movable camera, at the constant angular velocity in the range of 25–60 degrees per second prescribed in this patent application. Also necessary is having additional cameras record the scene from fixed locations spaced approximately 80 to 120 degrees apart about the scene. Said photographed flat shots (herein 2-D shots) will be inserted for a period of 5 to 40 seconds between the moving 3-D shots. While the moving 3-D shots will be inserted between 2-D shots in lengths of between 3 to 25 seconds. Another object of the inventors is to provide improved 3-D glasses for viewing three-dimensional films and videos, or video games which improve the illusion of the Pulfrich 3-D while avoiding adverse results. The said 3-D glasses have lenses formed of plastic film with one lens providing 100% light transmission and another mirrored lens which provides a specific neutral density in the range of about 0.5 to 2.0 with no discernable peaks in wavelength, color or spectrum. It is noted that the film which comprises the lenses may be formed of polyester, polycarbonate, cellutose, Lexon(TM) or other suitable materials which provide the desired reflection and transmission characteristics.

Accordingly, it is an object of the present invention to provide an improved technique for producing and presenting three-dimensional motion pictures, videos and video games.

An additional object of the present invention is to provide an improved technique for producing and presenting three-dimensional motion pictures, videos and video games which provides a strongly enhanced stereoscopic effect without distracting side effects. One improvement has been to determine the exact formula of speed a motion picture or video camera must be moving in order to obtain the ideal 3-D effects from the Pulfrich illusion and minimum motion side effects from too much speed.

A further object of the present invention is to provide an improved technique for producing and presenting three-dimensional motion pictures, videos and video games which provides a strong stereoscopic effect, while avoiding adverse results, such as dizziness, nausea and the like. This technique includes parameters for integrating motion shots to create the Pulfrich effect, and flat shots to prevent side effects such as motion queasiness from continuous circling. Too much movement leaves the problem of dizziness or potential nausea, while too much flat time will diminish the effect to the point where viewers do not perceive 3-D.

An additional object of the present invention is to provide an improved technique for producing and presenting three-dimensional motion pictures and videos including improved lighting and editing techniques which greatly enhance the stereoscopic effect.

A further object of the present invention is to provide improved glasses for viewing three-dimensional films and videos or video games which improve the illusion of the Pulfrich 3-D while avoiding adverse results.

One object of the present invention is to provide an improved technique for lighting three-dimensional motion pictures, videos and video games by providing layered lighting, more intense in the middle and backgrounds, to counter the superior perception of the human eye over the camera lens. The reason for increased lighting at farther distances away from the camera is to make up for the loss of light which the camera is unable to detect at greater distances, whereas the human brain will adjust naturally to the fact that the light intensity diminishes with distance. This enables the human eye to perceive 3-D at greater distances than is possible for a camera. Without extra lighting, the loss of light by the camera decreases the depth of field and reduces the 3-D effect which can be photographed by a moving camera. In addition, lighting from behind a subject, herein referred to as, backlighting, will increase the contrast seen by the eye. Whereas lighting used to illuminate todays motion picture and video scenes are done virtually in a reverse procedure of front lighting. Front lighting is used as the normal lighting procedure in obtaining single camera Pulfich 3-D in film or video; said front lighting procedure actually minimizes the Pulfrich 3-D effect. In addition, lights from behind the subject, that is, backlighting, increases the contrast seen by the eye and when interpreted as "normal lighting" causes an enhancement of the dimensionality of a scene. Hence, backlighting is used in addition to layered lighting as presented in this application. Thus the techniques developed by the present inventors will greatly improve the 3-D obtained in Pulfrich 3-D single camera systems.

A further object of the present invention is the use of lense for glasses, which filter light by reflection, not involving the color spectrum, to provide improved glasses for viewing three dimensional films, videos and video games which improve the 3-D effect by allowing full use of chromostereography and thus easing eye strain by eliminating one stage of mental processing. The brain automatically tries to match the colors observed through each eye to one another and may do so more easily when dealing only with a difference in light intensity, without a different color in each lens.

The inventors seek, through precise formulation, to create a maximum simulation of stereoscopic 3-D by incorporating the various elements put forth in this application, enabling the Pulfrich effect to be used for the first time to tell a story in continuity, in the use of a dramatic or comedic film or video, as the stereoscopic films of the 1950's did, to alleviate all eyestrain, dizziness and nausea sometimes felt as a result of the Pulfrich illusion, create a more obviously defined 3-D image that rivals the impressions of stereoscopic 3-D, to provide operational formulas, developed through extensive research, which improve the art form to such a level that motion pictures, television shows, videos and video games in Pulfrich 3-D will become a major practical industry.

A specific object of the present invention is to provide an improved method for producing and presenting three-dimensional motion pictures and videos wherein a scene to be photographed is illuminated in a manner such that the light intensity on the midground is approximately 50% greater than the intensity on the foreground and the light intensity on the background is approximately double that of the foreground and the scene is photographed by a movable camera, which is moved about the scene at a constant angular velocity in the range of 25–60 degrees per second which will produce optium 3-D with a single camera system. Also having additional cameras photograph the scene from fixed locations spaced approximately 120 degrees apart about the scene, resulting in inserting a flat sequence 5–40 seconds in length between moving sequences and moving shots in the length of 3 to 25 seconds in between said flat shots. Plus providing viewing glasses having lenses formed of plastic film with one lens providing 100% light transmission and a vacuum metallized second lens having a specific neutral density in the range of about 0.5 to 2.0.

These and other objects and features of the present invention will be apparent from the following detailed description, taken with reference to the figures of the accompanying drawings.

DETAILED DESCRIPTION OF THE INVENTION

As indicated above, applicants have found that numerous factors contribute to producing and enhancing three-dimensional effects in motion pictures, television, video tapes, video games and the like. In the first place, the scene 10 to be photographed, must be shot with a first motion picture camera 12, which is mounted on a dolly 14 which is movable on rails, indicated by dashed line 15, so as to move the camera 12 about the scene 10 in an arcuate path having its center at the center of the scene 10, as indicated by radius line 16, and at a constant angular velocity in the range of 25 degrees to 60 degrees per second. It has been found that movement at less than 25 degrees per second produces little, if any, three-dimensional effect, while movement at more than 60 degrees per second tends to make the viewer dizzy and nauseous. Actually, the optimum angular velocity is in the range of 45 degrees to 55 degrees per second, although acceptable results can be obtained throughout the range of 25 degrees to 60 degrees per second.

Figure 1:
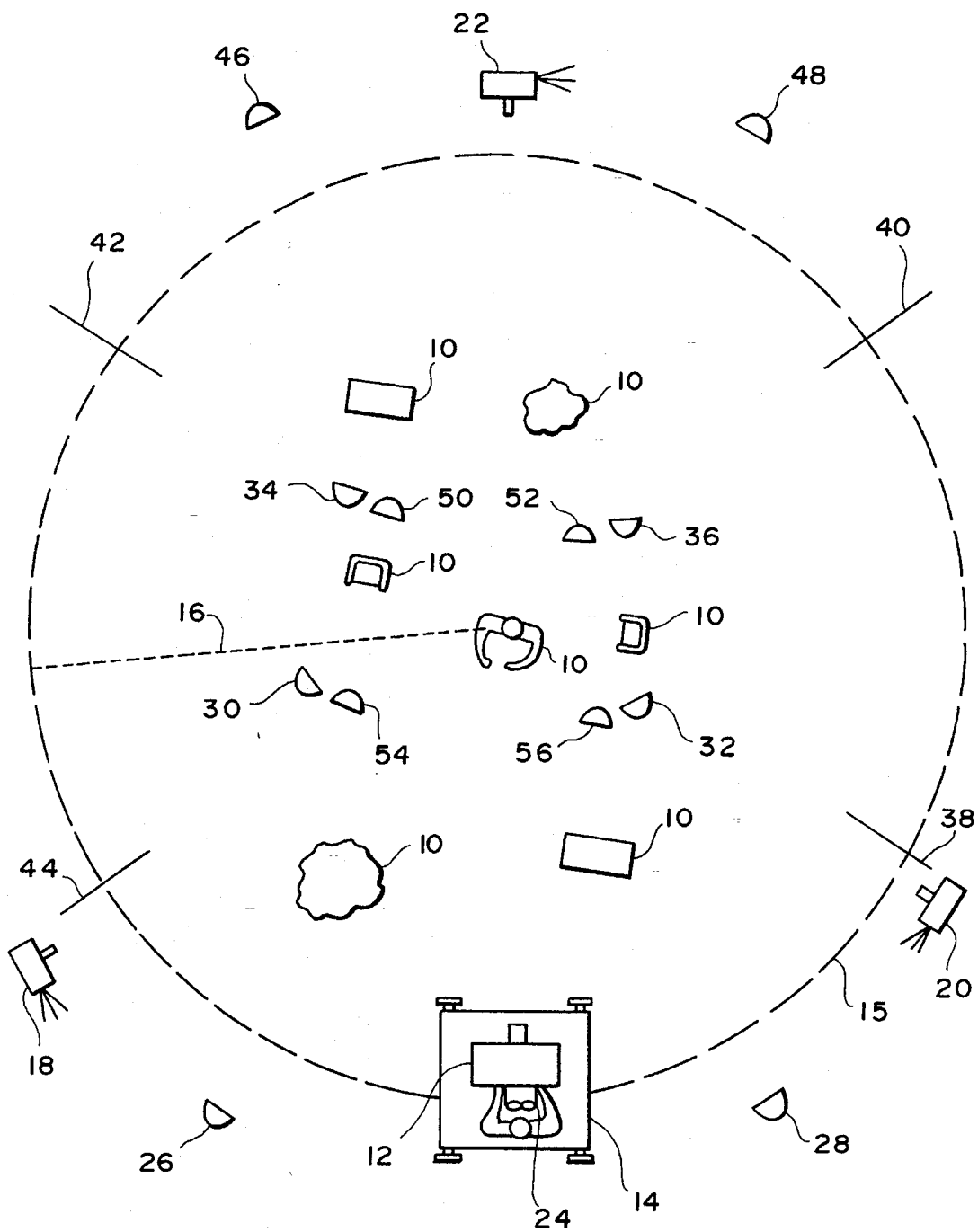
FIG. 1 is a diagrammatic representation showing the technique for photographing a scene, in accordance with the present invention, to maximize the three-dimensional effect.

Additional cameras are positioned at fixed locations spaced about 120, degrees apart about the scene 10, as seen at 18, 20 and 22 in FIG. 1. Also, it should be understood that the cameras 12, 18, 20 and 22 may be film cameras, video cameras or other suitable image recording devices. Another major factor in creating the three-dimensional effect is the lighting of the scene 10. As seen in FIG. 1, lights 26 and 28 are positioned to provide front lighting for the foreground of scene 10. However, to enhance the three-dimensional effect, additional lights 30 and 32 are positioned to provide lighting of the middle ground of the scene 10 at an intensity approximately 10%–50% greater than the intensity of the foreground lighting provided by lights 26 and 28, while lights 34 and 36 serve to illuminate the background of scene 10 at an intensity approximately double that of the foreground lighting provided by lights 26 and 28. Thus, for example the level of foreground illumination when shooting a scene indoors should be in the range of 200–400 foot candles lights while the illumination of the middle ground should be about 401–600 foot candle lights and the background illumination should be about 601–800 foot candle lights. When photographing a scene in natural outdoor lighting the level of foreground illumination should be in the range of 2000–3500 foot candle lights, while the illumination of the middle ground should be about 3501–5000 foot candle lights and the background illumination should be 5001–7000 foot candle lights. Furthermore, as dolly 14 transports the moving camera 12 about the scene 10 also, lights 50 and 52 are lit to illuminate the rear of the middle ground of scene 10 with a light intensity equal to that of lights 30 and 32, while lights 54 and 56 are lit to illuminate the rear of the foreground of scene 10 with an intensity at least double the intensity with which lights 26 and 28 illuminated the front of the foreground of scene 10.

Specifically, it has been found that, during editing, the three-dimensional effect can be maximized and dizziness or nausea caused by excessive movement can be avoided by alternating segments of 5 to 40 seconds duration, the photographing by one or more of the stationary cameras 18, 20 or 22, with segments of 3 to 25 seconds duration, photographed by the moving camera 12. This interspersing of flat and moving shots is the only way whereby viewers can watch the Pulfrich 3-D illusion for more than brief moments of special effects while avoiding some form of motion reaction.

Figure 2:
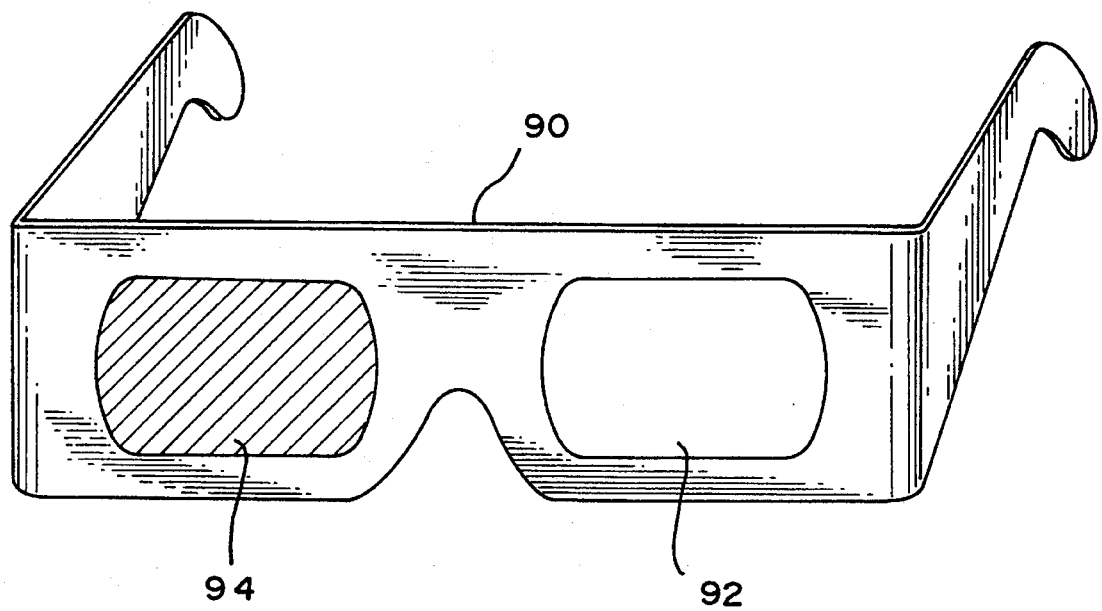
FIG. 2 is a pair of viewing glasses for enhancing the three-dimensional effect produced by the filming or video taping of a Pulfrich 3-D scene.

Finally, as seen in FIG. 2, viewing glasses 90 are provided for persons viewing the resulting film, television program, video tape or video game, to maximize the three-dimensional effect. The glasses 90 have lenses 92 and 94, with lens 92 having a 100% light transmission, while lens 94 is a clear film of suitable material, such as polyester, polycarbonate, cellulose or Lexon(TM), from 0.75 to 30 mils thick, with a vapor deposited coating of metal, such as aluminum or silver, and has a specific neutral density in the range of 0.5 to 2.0. The vapor deposited metal coating on such suitable material produces a mirror effect and results in low transmittivity without color absorption to distort picture colors, which allows full use of chromostereography. As noted above, it has been found that, with this difference in light transmissivity between the lenses 92 and 94, the eye viewing the scene 10 through lens 92 sends its image to the brain immediately, while the eye viewing the scene 10 through lens 94 delays passing its image to the brain for an interval which is sufficient to produce the Pulfrich illusion and, hence, to create the three-dimensional effect.

Obviously, numerous variations and modifications can be made without departing from the spirit of the present invention. For example, although the present method has been illustrated with the arcuate path being a circle, (a circle being preferred), other suitable elliptical paths and arcs can also be used, such as egg shaped, football shaped, or other oval paths. Therefore, it should be clearly understood that the forms of the present invention described above and shown in the figures of the accompanying drawings are illustrative only and are not intended to limit the scope of the present invention.

What is claimed is:

1. An optical viewing system for viewing 3-D images, said optical viewing system comprising:

a pair of lenses with a first of said lenses passing light at an intensity less than 50% of the intensity passed by a second lens and with no discernable wavelength, color or spectral peak in either, said first lens having vapor deposited metal formed thereon production a mirror effect and resulting in low transmittivity without color absorption to distort picture colors, wherein when said lenses are used to view an environment having layered lighting, optimized use of chromostereograpby is provided and an improved simulated stereoscopic effect is achieved.

2. The pair of glasses of claim 1, wherein: said pair of lenses comprises said second lens providing 100% light transmission and said first lens having a specific neutral density in the range of 0.5 to 2.0.

3. The pair of glasses of claim 1, wherein: said pair of lenses comprises said second lens providing substantially unobstructed light transmission and said first lens comprising a plastic film with said vapor deposited metal formed thereon, said first lens having a neutral density in the range of 0.5 to 2.0.

4. The pair of glasses of claim 1, wherein: said first lens is formed of plastic film coated with a said metal film to give a silvered appearance which is void of color absorption across all wavelengths.

5. The pair of glasses of claim 1, wherein: said first lens is made of partially mirrored film, being between 0.75–30.0 mils thick, that exhibits two distinct modes of optical transmission, one, when measured spectroscopically, and the second, when viewed through the lenses of glasses by the human eye, the former mode being such that, when graphed upon an abscissa covering the human visual range, the curve is flat, exhibiting no discernable wavelength, color or spectral peaks, and when used as a lens, the effective neutral density is in the range 12 of 0.5–2.0.

* * * * *